(No Model.) 2 Sheets—Sheet 1.

M. M. BLEDSOE.
GRAIN RACK FOR WAGONS.

No. 316,441. Patented Apr. 28, 1885.

WITNESSES:
Jas. F. D'Hamel.
Walter S Dodge.

INVENTOR:
Milam M. Bledsoe,
by Dodge & Son,
Attys.

(No Model.) 2 Sheets—Sheet 2.
M. M. BLEDSOE.
GRAIN RACK FOR WAGONS.
No. 316,441. Patented Apr. 28, 1885.
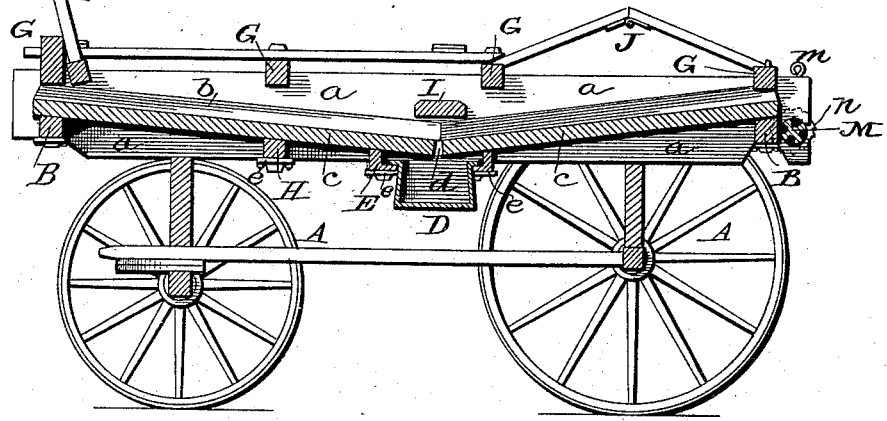
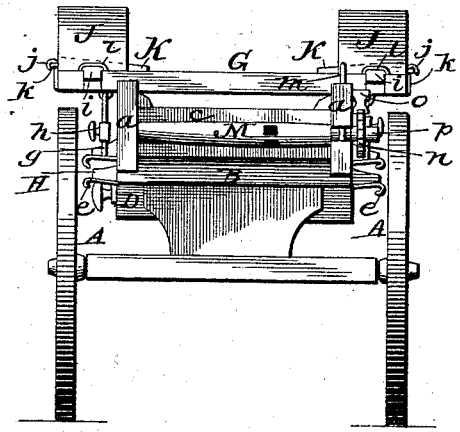
WITNESSES
INVENTOR:

UNITED STATES PATENT OFFICE.

MILAM M. BLEDSOE, OF PALMYRA, MISSOURI.

GRAIN-RACK FOR WAGONS.

SPECIFICATION forming part of Letters Patent No. 316,441, dated April 28, 1885.

Application filed June 30, 1884. (No model.)

*To all whom it may concern:*

Be it known that I, MILAM M. BLEDSOE, of Palmyra, in the county of Marion and State of Missouri, have invented certain Improvements in Wagons, of which the following is a specification.

My invention relates to wagons; and it consists in a novel construction of the bodies thereof, whereby they are peculiarly adapted for carrying grain, as hereinafter fully explained.

Figure 1:
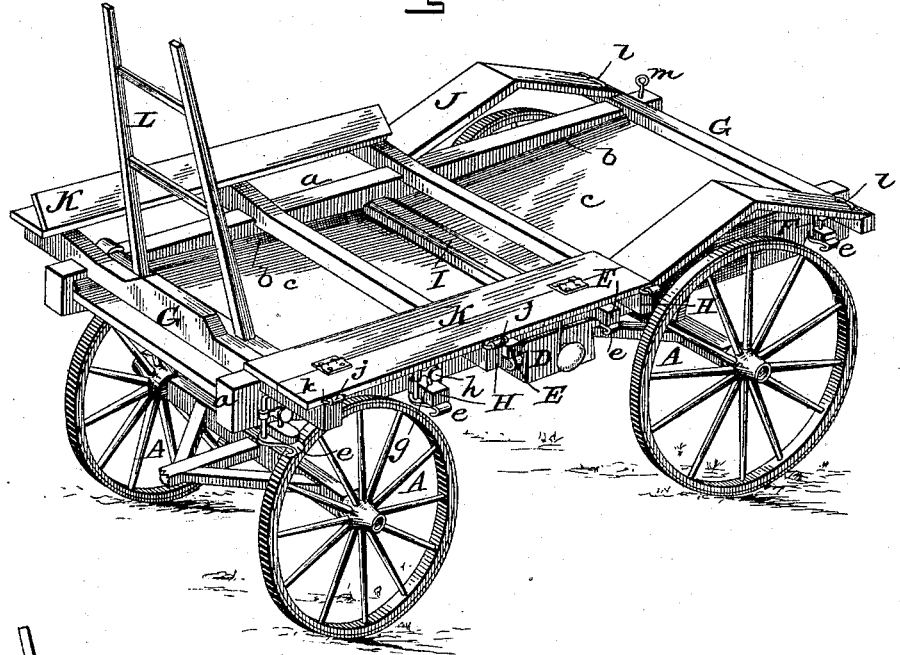
Figure 2:
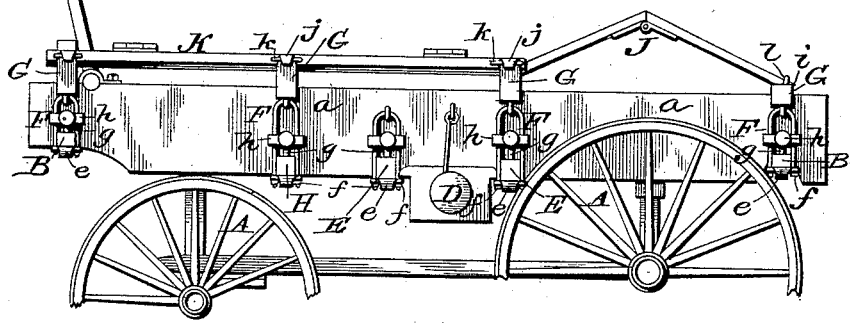

In the accompanying drawings, Figure 1 is a perspective view of a wagon provided with my improved body; Fig. 2, a side elevation of the same; Fig. 3, a longitudinal central section, and Fig. 4 a rear end view of the wagon.

The purpose of my invention is to provide a wagon-body which shall be capable of use for all ordinary purposes, and adapted to the carrying of grain, hay, and like matters, and which shall when thus adapted collect and save the grain or seed which is ordinarily lost in carrying.

To this end the invention consists in forming the body with a bottom sloping to a common discharge point or outlet, beneath which is placed a drawer or receptacle to receive and hold the grain or seed which falls upon the bottom; in placing above such outlet or discharge opening a guard to prevent the same from becoming clogged; in providing the body with removable cross-timbers to support wheel-guards and to hold the grain or hay up off the floor or bottom sufficiently to permit the loose grain or seed to travel down to the receptacle provided for it; in providing removable guards to hold the grain or hay off the wheels and to deliver the loose grain or seed into the wagon-body proper; in providing the body with a removable upright end frame to prevent the load from sliding off at the end, and to receive the pole or rope commonly passed over the load, and, finally, in providing a removable windlass or roll upon which to wind the rope.

Having thus outlined the invention, I will proceed to describe the same more in detail, referring to the accompanying drawings, in which—

A represents the ordinary running-gear of a wagon, which, of course, needs no further description, and B B the bolsters thereof, upon which the body C rests, as usual. The body is formed with two side-boards, a a, each furnished with cleats b, to receive the front and rear bottom boards, c c, which incline toward the mid-length of the body, where they abut against suitable stops, so as to leave a space, d, of some inches between their ends to permit the grain or seed which fall upon the bottom and roll down the same to fall through to a drawer or receptacle, D, placed below the opening d. The drawer slides in guards or rabbeted cross-bars E, extending across the under side of the body and projecting somewhat beyond each side, in which position they are firmly held by yokes F, suspended from above and arranged to straddle and swing beneath the ends of the cross-bars E, as in Figs. 1 and 2. Each yoke consists of a staple-shaped iron, which may be made of light rod-iron or of large and heavy wire bent into the form required, shouldered and threaded at its ends, and having said ends passed through a plate, e, and secured by nuts f. Each plate e is curled at its outer end to afford a convenient hold for the hand in moving the yokes, and is also perforated to receive the end of a locking-bolt, g, carried by a slide, h, which moves upon and is guided by the yokes, as is shown in Figs. 1 and 2, the bolt passing vertically through the bar E and then through the plate, and thereby preventing the yoke slipping off the end of the cross-bar.

G indicates a cross timber or beam, of which there are several, extending across the body, upon which they rest and extending outward at their ends beyond the sides a, as shown. These beams are each provided with a yoke, F, and locking-bolts g in all respects similar to those employed for retaining the drawer-guides in place. The front and rear beams are placed directly above the front and rear bolsters, B B, and their yokes clasp the ends of said bolsters, as shown, thereby firmly securing the body to the running-gear of the wagon. The intermediate beams are similarly connected by yokes F to cross-bars H, extending beneath the body from side to side, as in Fig. 1. The rear supporting-guide or cross-bar, E, of the drawer D answers for one of these lower cross-bars. The beams G and cross-bars H are notched slightly, as are also the upper and lower edges of the sides a a, so that when the yokes are bolted in place over the ends of the cross-bars the body is firmly locked together and is rigid and unyielding. The beams G serve to hold the hay and straw off the floor C and to allow the seed or loose grain to roll down to the outlet $d$, which is shielded and prevented from being closed by the hay and straw by means of a guard, I, extending from side to side of the body, and somewhat wider than the opening $d$, the guard being raised sufficiently to allow the grain to pass freely beneath it.

J J are wheel-guards, each composed of two parts hinged or jointed together at one end, and each provided at the opposite end with a tongue or ear, $i$, to enter an eye or staple, $l$, formed in or applied to the ends of the beams G, just in front and in rear of the rear wheels. By thus jointing or hinging the guards their ends may be readily inserted into and withdrawn from the eye or staple, and the guards may be folded into compact space.

K K are grain-rests consisting of flat boards, preferably divided longitudinally through the middle, and hinged together to permit being folded into small compass. These rests or boards are furnished with staples $k$ at their outer sides, which are passed beneath ears or hooks $j$, secured upon the ends of beams G, for the purpose of retaining the boards in place. The outer ends of beams G are slightly raised to cause the boards to incline upward, so that any loose grain falling upon them may roll down to the body proper.

L indicates the usual frame employed on grain-wagons to prevent the load from sliding off at the end of the wagon, to guide the reins, and to receive the front end of the binding pole or rope. When the sides $a$ are released, the journals of frame L are readily withdrawn, and the frame thereby disconnected.

A rope-roll or winding-drum, M, is likewise provided, one of its journals being passed through a hole or opening in one side-board $a$, while the other is seated in an open-ended slot in the other side and retained therein by a large pin, $m$, of iron or wood. One journal, $p$, of the roll M is extended beyond the side $a$, and carries a ratchet-wheel, $n$, which is engaged and held against rotation by a pawl or dog, $o$. Said extended journal is also perforated to receive a hand-spike, N, by which it may be turned as required.

The body thus constructed may be readily set up or taken apart and packed away until needed.

I am aware that detachable racks or frames have been made in separate parts or sections and applied to ordinary wagon-bodies to adapt the wagon to carrying hay or hogs, according to the adjustment of the parts; that hay-wagons have been provided with windlasses to tighten the binding-rope, and that railway-cars have been provided with a sloping bottom having an outlet at the lowest point to insure the convenient and prompt discharge of grain or like cargoes. I am not, however, aware that a wagon-body has ever before been constructed as herein described and shown, and thus adapted to be taken entirely apart when not required for use; or that a windlass has ever before been applied to a wagon in the manner herein set forth, whereby its ready removal is permitted; or that a farm-wagon has ever before been furnished with a sloping bottom and a drawer or receptacle below said bottom to collect and retain loose grain.

Having thus described my invention, what I claim is—

1. In combination with a wagon-body sloped to a discharge-outlet, a drawer or receptacle placed beneath said outlet, substantially as and for the purpose explained.

2. The herein-described wagon-body, consisting of sides $a\ a$, bottom boards, $c\ c$, cross-bars G H, and yokes F, provided with bolts $g$, all substantially as shown and described.

3. In combination with a wagon-body, overhanging beams G, provided with ears $j$, and grain rests or boards K, provided with staples $k$, to pass over said hooks as and for the purpose set forth.

4. In combination with side-boards $a\ a$, one perforated and the other slotted, a rope-roll, M, having its journals seated, respectively, in the perforations and the slot, and the retaining-pin $m$, extending across the slot, as shown.

5. In combination with the inclined bottom of a wagon-body and with the discharge-opening thereof, a guard placed over the outlet to support the straw and prevent the outlet being clogged.

6. In combination with side-boards $a$, cross-beams G, above the bottom, cross-bars H, below the bottom, yokes F, pivoted to one set of cross-pieces and adapted to clasp the other set, and locking-bolts applied to said yokes, substantially as shown and described.

7. In combination with a separable wagon-body substantially such as described, and with its cross-bars, yokes F, for binding the parts together, provided with plates $e$, and slides $h$, carrying bolts $g$.

MILAM M. BLEDSOE.

Witnesses:
J. C. B. THOMAS,
D. O. LANE.